US010487999B2

(12) United States Patent
Chien

(10) Patent No.: US 10,487,999 B2
(45) **Date of Patent: *Nov. 26, 2019**

(54) MULTIPLE FUNCTIONS LED NIGHT LIGHT

(71) Applicant: Tseng-Lu Chien, Walnut, CA (US)

(72) Inventor: Tseng-Lu Chien, Walnut, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/739,666

(22) Filed: Jun. 15, 2015

(65) Prior Publication Data

US 2016/0003431 A1 Jan. 7, 2016

Related U.S. Application Data

(63) Continuation of application No. 11/806,285, filed on May 31, 2007.

(51) Int. Cl.

| | |
|---|---|
| ***F21S 8/00*** | (2006.01) |
| ***H01R 33/92*** | (2006.01) |
| ***F21V 5/04*** | (2006.01) |
| ***F21V 15/01*** | (2006.01) |
| ***F21V 33/00*** | (2006.01) |
| ***F21V 23/06*** | (2006.01) |
| ***F21S 9/02*** | (2006.01) |
| ***F21K 9/232*** | (2016.01) |
| ***F21K 9/60*** | (2016.01) |
| ***F21Y 115/10*** | (2016.01) |
| ***F21Y 113/13*** | (2016.01) |

(Continued)

(52) U.S. Cl.

CPC ................ *F21S 8/035* (2013.01); *F21V 5/04* (2013.01); *F21V 15/01* (2013.01); *H01R 33/92* (2013.01); *F21K 9/232* (2016.08); *F21K 9/60* (2016.08); *F21S 9/022* (2013.01); *F21V 23/02* (2013.01); *F21V 23/04* (2013.01); *F21V 23/06* (2013.01); *F21V 33/0052* (2013.01); *F21Y 2113/13* (2016.08); *F21Y 2115/10* (2016.08); *H01R 24/76* (2013.01); *H01R 2103/00* (2013.01)

(58) Field of Classification Search

CPC ............. F21Y 2101/02; F21Y 2103/00; F21Y 2113/00; F21Y 2113/02; F21V 23/04; F21V 23/06; F21S 8/02; F21S 8/035; F21W 2121/00; F21K 9/00

USPC ................ 362/640, 641, 644, 147, 228, 240

See application file for complete search history.

(56) References Cited

U.S. PATENT DOCUMENTS 3,974,495 A 8/1976 Jones
3,976,986 A * 8/1976 Zabroski .................. F21L 4/08 340/656

(Continued)

*Primary Examiner* — William N Harris

(74) *Attorney, Agent, or Firm* — Bacon & Thomas, PLLC

(57) ABSTRACT

A multiple function LED night light has at least one LED device and added function(s) such as an air-freshener adaptor device, sonic device, frequency device, sensor device, bug repeller device, second light device, timepiece, electric message device, timer device, temperature device, surge protection device, electric short circuit protection device, base device for installation on an existing lamp socket, emergency light device, or any other electric device(s) suitable for home use to keep people comfortable or safe. The LED device has a first optic means to change the narrow-viewing angle of an LED's spot-light beams into a wider-viewing angle and second optic means to help make the LED night light exhibit a smooth lighting effect. The device may be arranged to fit into an existing night light bulb socket to turn any existing bulb night light into a power saving LED night light.

24 Claims, 3 Drawing Sheets

(51) Int. Cl.

| | |
|---|---|
| ***H01R 103/00*** | (2006.01) |
| ***H01R 24/76*** | (2011.01) |
| ***F21V 23/02*** | (2006.01) |
| ***F21V 23/04*** | (2006.01) |

(56) References Cited

U.S. PATENT DOCUMENTS 4,549,250 A * 10/1985 Spector .................... A61L 9/03 261/DIG. 88
4,782,276 A * 11/1988 Guterman ................ H02P 8/00 318/685
4,816,973 A * 3/1989 Atalla .................... F21S 8/035 362/101
5,465,198 A * 11/1995 Kellogg ................. F21S 8/035 362/253
5,544,025 A * 8/1996 Bohlool ................. F21S 8/035 362/249.01
5,664,867 A * 9/1997 Martin ................. F21V 33/004 340/686.1
5,727,953 A * 3/1998 Pasholk ................. F21S 8/035 439/21
5,909,087 A * 6/1999 Bryde ............... H05B 37/0263 315/149
5,924,784 A 7/1999 Chliwnyj et al.
5,926,440 A * 7/1999 Chien .................... F21S 8/035 362/253
5,951,145 A * 9/1999 Iwasaki .................... F21S 8/04 362/216
6,132,057 A * 10/2000 Williams ............... E05B 17/10 362/100
6,220,722 B1 4/2001 Begemann
6,474,829 B2 * 11/2002 Clodfelter .............. F21S 8/035 362/198
6,478,440 B1 11/2002 Jaworski et al.
6,499,853 B2 * 12/2002 Stekelenburg .......... F21S 8/035 362/231
6,499,860 B2 12/2002 Begemann
6,522,242 B1 * 2/2003 Barrus .................. G08B 5/228 340/568.1
6,522,955 B1 * 2/2003 Colborn ................. H02J 3/005 307/10.1
6,577,073 B2 6/2003 Shimizu et al.
6,648,496 B1 11/2003 Elghoroury et al.
6,709,126 B1 * 3/2004 Leen ...................... F21S 8/035 315/159
6,762,563 B2 7/2004 St-Germain et al.
6,894,434 B1 * 5/2005 Kosoff ................. A61M 21/02 315/134
6,905,231 B2 6/2005 Dickie
6,911,915 B2 6/2005 Wu et al.
6,926,426 B2 * 8/2005 Currie .................... F21S 8/035 362/147
6,953,264 B2 10/2005 Ter-Hovhannisian
7,006,002 B2 * 2/2006 Shomali ................... F21L 4/08 340/539.1
7,025,473 B2 * 4/2006 Dokoupil ............... F21S 8/035 362/295
7,036,948 B1 * 5/2006 Wyatt ............... H01R 13/6683 362/276
7,045,975 B2 * 5/2006 Evans .................... F21S 8/035 315/149
7,186,016 B2 * 3/2007 Jao ......................... B44C 5/005 362/101
7,207,697 B2 * 4/2007 Shoji ...................... F21V 5/045 362/187
7,336,157 B2 * 2/2008 Richmond .......... F21V 21/0824 340/326
7,524,089 B2 4/2009 Park
7,581,865 B2 * 9/2009 Wakitani ............. G02B 6/0021 362/602
7,592,719 B2 * 9/2009 Hoopes ................. H01R 13/60 307/147
7,932,482 B2 * 4/2011 Norwood ........... A01M 1/2077 219/494
2003/0185020 A1 10/2003 Stekelenburg
2004/0246704 A1 * 12/2004 Burdick .............. H01R 13/465 362/95
2006/0146527 A1 7/2006 Vanderschuit

* cited by examiner

Different with Prior-Art 6,227,679 5/8-2001

Bug Repellor Device or 2nd function Device

MULTIPLE FUNCTIONS LED NIGHT LIGHT

BACKGROUND AND SUMMARY OF THE INVENTION

The following co-pending U.S. patent applications by the same Inventor also are directed to night lights:

Ser. No. 10/883,747, filed Jul. 6, 2004 (Fiber Optics light kits for footwear);
Ser. No. 11/092,741 filed Mar. 30, 2005, Now U.S. Pat. No. 7,232,251;
Ser. No. 11/094,215 filed Mar. 31, 2005 (LED night light with liquid optics medium);
Ser. No. 11/255,981 filed Oct. 24, 2005;
Ser. No. 11/498,881 filed Aug. 4, 2006;
Ser. No. 11/527,631 filed Sep. 27, 2006 (LED night light with interchangeable display unit);
Ser. No. 11/498,874 filed Aug. 4, 2006;
Ser. No. 11/527,629 (Time piece with LED night Light); and
Ser. No. 11/527,6281 (Multiple function Night light with Air Fresher).
Ser. No. 11/806,284 filed on May 31, 2007 Publication data US 2008/030-4289, Now is U.S. Pat. No. 7,632,004 issued date Dec. 15, 2009. U.S. application Ser. No. 11/806,284 filed on May 31, 2007 same day filed of Ser. No. 11/806,285 which is parent of (#R-3).

In addition, the Inventor's U.S. Pat. Nos. 5,926,440; 6,158,868; 6,170,958; 6,171,117; 6,280,053 disclose arrangements of conductive means for night lights and multiple function night lights incorporated time pieces. Other U.S. Pat. Nos. 4,947,291; 5,495,402; 5,662,408; 5,713,655; 5,803,579; 5,816,682; 5,833,350; 5,893,626; 5,998,928; 6,000,807; 6,010,228; 6,031,958; 6,033,087; 6,056,420; 6,132,072; 6,160,948; 6,161,910; 6,183,101; 6,190,017; 6,290,368; 6,337,946; 6,386,730; 6,390,647; 6,00,104; 6,411,524; 6,431,719; 6,509,832; 6,523,976; 6,550,949; 6,609,812; 6,623,416; 6,641,289; 6,648,496; and 6,709,126 all show different light sources and applications but none teaches an LED night light having multiple functions which may be selected from the group including an adaptor device, fan device, heat device, bug repelled device, sonic device, frequency device, or any other home electric appliance or device suitable for adding onto an LED night light.

The current invention offers a big improvement in power saving because it incorporates the low power consumption Light Emitting Diode (LED) to replace the incandescent bulb which normally uses a 4 Watt or 7 Watt or more power 10 consumption light means. A single LED normally has a 0.3 Watt+/−100% power consumption depending on the product design and illumination needed.

The current invention not only provides a power saving device but also reduces a consumer's monthly electricity expense. The current invention also supplies two or more additional practical functions to the consumer, which may selected from, for example, an air-freshener and/or (as described in co-pending U.S. patent application Ser. Nos. 11/527,631; 11/527,629; 11/498,881; 11/498,874; and Ser. No. 11/527,628; etc.) an adaptor device, sonic device, frequency device, bug repeller device, second light device, timepiece, electric message device, timer device, temperature device, surge protection device, electric short circuit protection device, base device for installation on an existing lamp socket, emergency light device, or any other electric device(s) used in a home to keep people comfortable or safe.

This current invention optionally may further incorporate the teachings of the co-pending U.S. application Ser. No. 11/806,284 filed on May 31, 2007 Publication data US 2008/030-4289, Now is U.S. Pat. No. 7,632,004 issued date Dec. 15, 2009. entitled "LED night light with more than one optics means" concerning the inclusion in the LED night light of an optical element that improves the visibility of light beams from the LED.

All existing LED nightlights have the big problem that the LED unit can be seen by a viewer over a narrow viewing angle only, and that the brightness over that angle is too strong, resulting in spot-light effects (super bright in a small area). The co-pending U.S. application Ser. No. 11/806,284 filed on May 31, 2007 Publication data US 2008/030-4289, Now is U.S. Pat. No. 7,632,004 issued date Dec. 15, 2009 teaches multiple (more than one) optics means to provide a big improvement from spot-light to linear or area brightness, thereby causing the spot-light effects to change to a nice looking lighting effect such as that provided by a fluorescent tube. It is very difficult to use only one piece of optics means to cause the strong spot-light LED unit(s) to have nice and warm light effects that can be seen by a viewer. This is a big improvement in the LED night light.

The current invention further adds some other arrangement such as reflector(s), bubble(s), or lens(es) within any of the optics means to increase the effects of modifying the narrow viewing angle light beams emitted out of the LED(s) to provide linear or area light effects.

Furthermore, the current LED night light invention solves several problems with the most popular night light in the market place. The most popular night light length is around 88 mm+/−50 mm (with base), The lens height is around 60 mm+/−30 mm (without base). The height from the wall outlet cover is around 35 mm+/−15 mm (from outlet cover surface). If the LED unit is placed on the same location as the outlet cover surface, the distance from the wall to the outside of the lens will be less than 35 mm+/−15 mm, which is too short to make the spot-light LED's into a surface or area photometric or lighted area. The problem is solved by using two optics means to get a good surface or area lighting effect as U.S. application Ser. No. 11/806,284 filed on May 31, 2007 Publication data US 2008/030-4289, Now is U.S. Pat. No. 7,632,004 issued date Dec. 15, 2009. In addition, the LED night light power consumption will fall within the 0.3 W+/−100% per LED range, whereas the power consumption of a bulb night light falls within 4 Watt+/−50% per bulb. So, the LED night light will have a big power saving and reduce the monthly electric bill for the consumer.

The current invention do not only provides a simple multiple function LED night light, but also provides excellent light performance. The LED night light with more than one function can add any function selected from, by way of example, an adaptor device, motion sensor device, PIR sensor device, air freshener, second light device, bug repellent device, sonic repellent device, surge protection device, emergency light device, time device, timer device, or any combination so the LED night light can behave nice light performance with more than single functions.

DETAILED DESCRIPTION OF THE PREFERRED EMBODIMENTS

Figure 1:
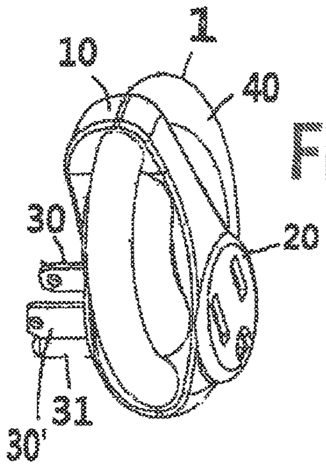
FIGS. 1-4 are perspective views taken from different viewing angles showing a first preferred embodiment of a multiple function of LED night light.
Figure 13:
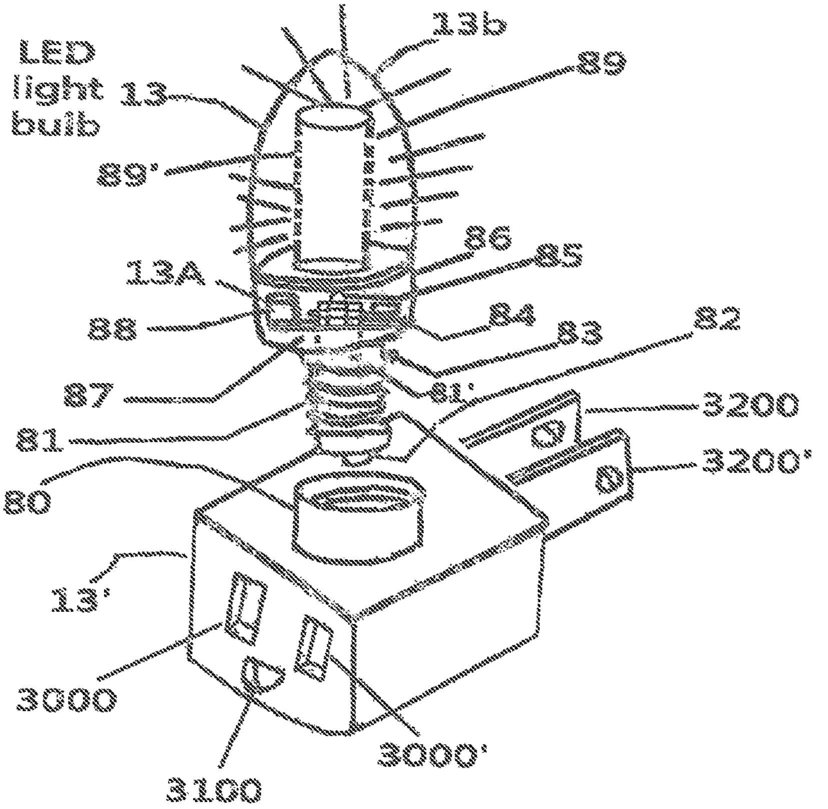
FIG. 13 is a perspective view of a fifth preferred embodiment of a multiple function of LED light with a base device for installation on an existing lamp socket.

FIG. 1 shows a first preferred embodiment of a multiple functions LED night light in which the added function is adaptor device. The added function(s) may alternatively be selected from the devices described in FIG. 13 shown bug-repellor or-and $2^{nd}$ electric device or-and co-pending U.S. patent application Ser. Nos. 11/527,631; 11/527,629; 11/498,881; 11/498,874; and 11/527,628 etc. such as an (i) airfreshener, (ii) adaptor device, (iii) sonic device, (iv) frequency device, (v) bug repelled device, (vi) second light device, (vii) timepiece, (viii) electric message device, (ix) timer device, (x) temperature device, (xi) surge protection device, (xii) electric short circuit protection device, (xiii) base device for installation on an existing lamp socket, (xiv) emergency light device, or (xv) any other electric device(s) suitable for home use to keep people comfortable or safe. The added function(s) may be one to N (any number) to make a very practical multiple functions LED night light.

As shown in FIG. 1, the multiple function LED night light (1) has a back housing (10) assembled with a front housing (20) and arranged to capture prong (30) (30') (31) within and enable delivery of electricity from the outlet AC power source through the adaptors (20) to the other electric appliance device (not shown). An optics-lens (40) exhibits light effects from the inner LED or LEDs to provide a light performance having predetermined functions, time, duration and so forth as required.

Figure 2:
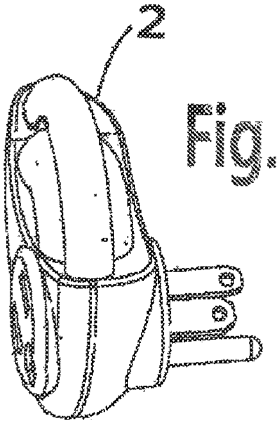
Figure 3:
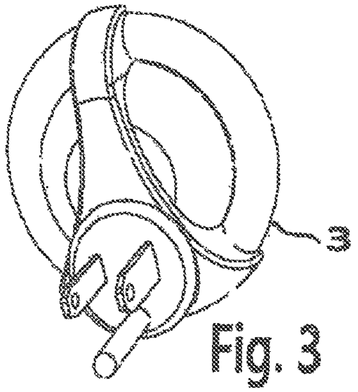
Figure 4:
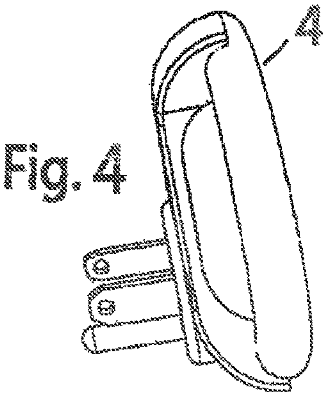

FIGS. 2, 3, 4 show the multiple function LED night light of FIG. 1 from different viewing angles.

Figure 5:
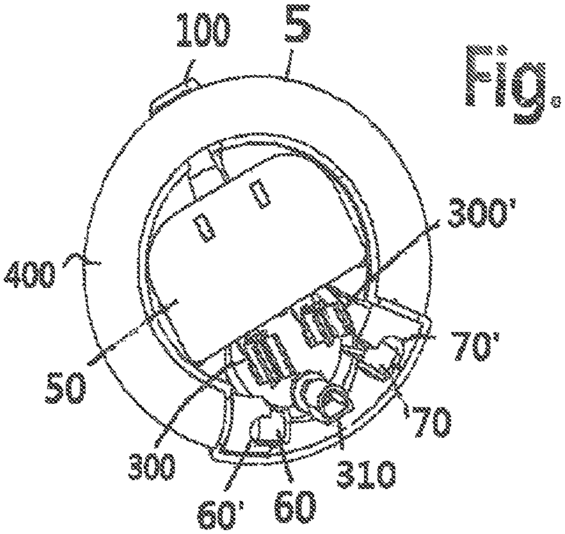
FIG. 5 is a partially cut-away front view showing construction details of the preferred embodiment illustrated in FIGS. 1-4.

FIG. 5 shows details of the inner construction of one of preferred embodiment of variety of the multiple function LED night light (5) which has a back housing (100) and which holds an optic-lens or optics medium (400) having a ring design which is adjacent a circuit board (50) that connected to prong (300) (300') to deliver input home electricity to circuit-board (50) and the LEDs (60) (70) and cause the LEDs (60) (70) to emit a light beam into the optic-lens or optics medium (400) from the two input ends (60') and (70').

The preferred ring optics-lens or preferred optic-medium has input ends are "U" shaped so as to allow as many of the light beams emitted from the LEDs (60) (70) to enter the optic-lens or optics medium as possible. Some applications may have other designs for the optic-lens or optics medium and input ends, which is not a limitation for the current invention's preferred embodiment description. The input ends design can be any type which is still within the current invention scope. The prong (310) is a grounded type to provide more safety for the adaptor device. This prong arrangement can be varied depending on the different requirements of safety authorities or governments.

The optic-lens or optics medium and of FIG. 5 may have different arrangements that use sand-blasting to make the surface very rough and allow all the light to travel within without excess leakage, or use a plurality of the air-bubbles (or equivalent reflectors) inside the optic-lens or optics medium and to cause light beams from the LEDs to exit the optic-lens or optics medium big-surface not the ends and make whole piece or big-surface of optics-lens or-and optics medium with splendid bright spots showing along the length of the medium.

As shown in FIG. 5), the circuit (50) may incorporate desired electric components selected from the group including, alone or in combination, at least one resistor, capacitor, switch, sensor, diode, inductor, transformer, integrated circuit (hereafter as IC), or any available components suitable for electrically driving LED(s) to have predetermined functions, duration, time, effects, and/or brightness. The appropriate conductive-piece(s) used for the electric connection to the prong (300) (300') (310) and LEDs (60) (70). The said conductive-piece(s) can be obtained from the marketplace and may include electric wires, and/or a wire-harness, cable, spring, metal pieces, or other conductive piece(s) without departing from the scope of the invention, as long as an electric signal can be delivered from the circuit (50) to the prong and LEDs means.

FIGS. 6-10 show the same features as FIGS. 1-5, the only difference being the different housing and optic-lens design with different space to arrange the LEDs, prong, circuit, and added device(s) on the LED night light. From FIG. 6, The said LED light has base (6*a*) has circuitry inside to change AC current from outlet into desired current for inner LED or LED(s) light source(s) to turn-on and turn-off with desired functions. The LED or LED(s) light-beam emit to the $2^{nd}$ preferred optic-lens or optics medium (6*d*) (6*c*) which has same or different treatment(s) to make the narrow emit-angle LED or LED(s) light beam to spread out to whole or big-size surface of the said optics-lens (6*d*) or optics-medium (6*c*) and the different with optics-lens (400) at the shape and inner construction.

The said FIG. 5 is solid and circle or donut or arc shape and is solid-piece without any hollow-inside or space-inside to add parts inside and optis-lens (400) emit light from whole body or length to let people see the illumination for big-area(s) not the ends. The optics-lens (6*c*) and (6*d*) same as the FIG. 5 the lens surface has desired treatment including same as FIG. 5 sand blaster or other textures or marking to make the narrow emit-out LED light beams to passing through and make a whole optics-lens or big area for illumination. This is not same as Prior arts to have ends glow or had tube on top with extra-piece to make the light-beam to be seem on whole surface of the optics-lens (400) or (6*c*) (6*d*). From the FIG. 6 optics-lens (6*c*) or (6*d*) is not a solid piece and it is a slim-piece to save plastic-expensive cost but can spread-out LED light-beam to whole or big-size surface.

Figure 6:
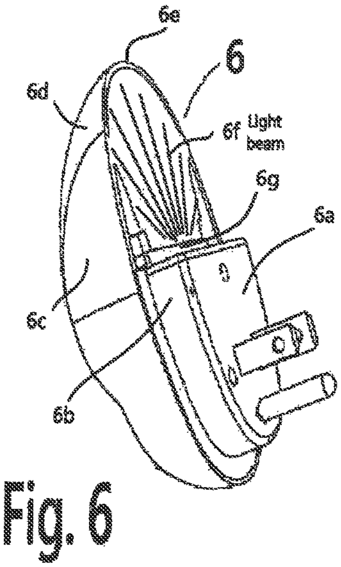
FIGS. 6-10 are perspective views at different viewing angles of a second preferred embodiment of a multiple function LED night light.
Figure 7:
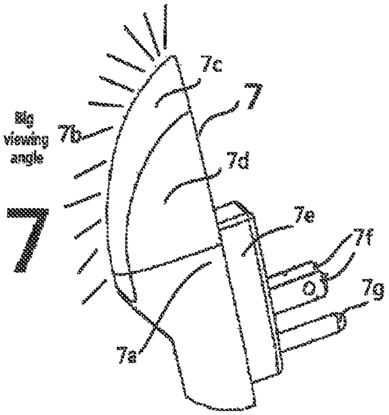

From FIG. 6 can see LED narrow emit-out light beam through the first optical element in geometiric shape (6*g*) and second optical element or optics-lens (6*c*) (6*d*) or flat optical element (6*g*) to spread out to wider areas as FIG. 7 (7*b*).

Figure 8:
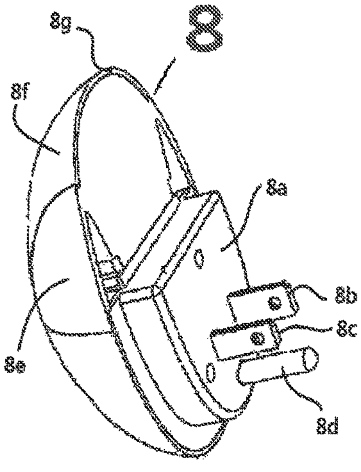
Figure 9:
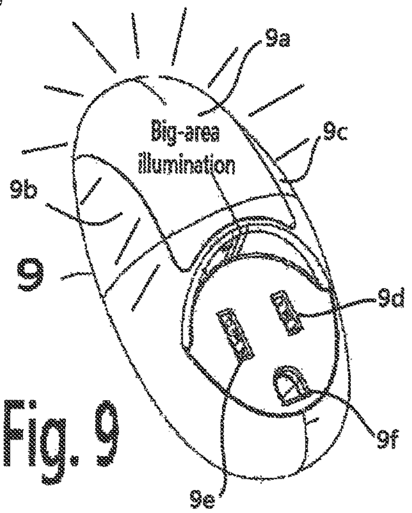

From FIG. 8 show the optics-lens (8*g*) is one of second optical element and has preferred textures or marking or optics-designs (not shown but same FIG. 5 optics-lens (400) has sand-blaster treatment) on the one or two surface of the optics-lens (8*f*)(8*e*) second optical element (8*g*). From the FIG. 9 show the Big area illumination (9*a*) which change from the narrow emit-out LED light beam passing through the front the optics-lens (9*a*) or-and (9*b*) or-and (9*c*) to become wider spread-out light-beam to make wider-area can see the illumination. The said added function or-and $2^{nd}$ electric-functions can like the ports (9*d*) (9*e*) or adaptor-hole which also can be a 3 prong outlets to allow other electric-device 3 male-prongs to insert as FIG. 1 to FIG. 5 shown. The said ports (9*d*) (9*e*) or adaptor-hole also can be any other $2^{nd}$ functions as above discussed (i) to (xv) 15 preferred type of the $2^{nd}$ electric functions.

Figure 10:
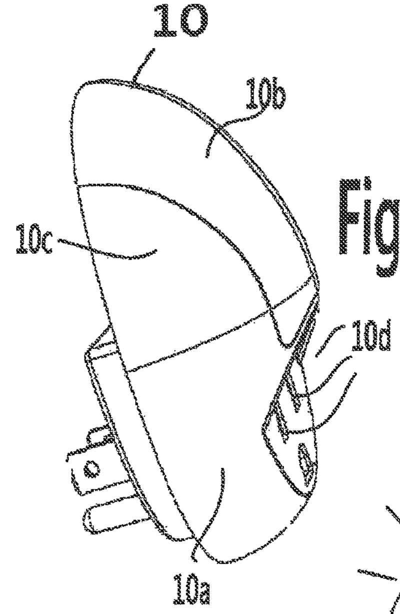

From FIG. 10 show the preferred embodiment has optic-lens (10*a*) (10*b*) (10*c*) which has desired texture or optics-design to make desired-areas has illumination from inner LED or LED(s) in any type and combination with desired circuitry to make desired light show.

Figure 12:
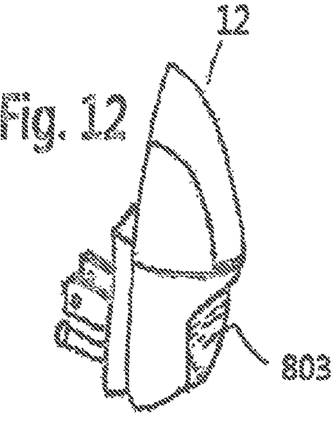
FIG. 12 is a perspective view of a fourth preferred embodiment of a multiple function LED light.
Figure 11:
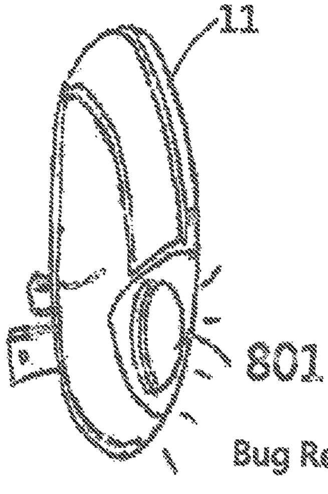
FIG. 11 is a perspective view of third preferred embodiment of a multiple function of LED light.

FIG. 11 shows a multiple function LED night light, in which the added function (801) can be selected from the group including any as above and below discussed (i) to (xv) 15 examples for $2^{nd}$-functions list but not limited for these 15 examples of $2^{nd}$ or more functions, or-and as disclosed in co-pending U.S. patent application Ser. Nos. 11/527,631; 11/527,629; 11/498,881; 11/498,874; and 11/527,628 etc., of an air freshener, adaptor device, sonic device, frequency device, bug repeller device, second light device, timepiece, electric message device, timer device, temperature device, surge protection device, electric short circuit protection device, base device for installation on an existing lamp socket, emergency light device, or any other electric device(s) suitable for home use to keep people comfortable or safe. From FIG. 12 also shows a multiple function LED night light whose added functions can be selected from the above listed functions.

From FIG. 13 shows a multiple function LED night light in which a special LED bulb (13) is included in the existing multiple function bulb night light housing with added function (13'). The multiple function LED night light of FIG. 13 has at least one LED device is built-in or add-on to installed on a geometric base that also has the added electric, mechanical, or chemical function. The LED light unit has base and has a bulb socket to accept the conventional bulb base, which may select from a screw type, pin type, rivet type, or knob type. The LED device has built-in circuit to change the original LED-light prong input-end AC electric signal to an LED's DC electric Signal, so as to turn on the LED(s) to exhibit predetermined function, duration, time, and/or brightness and light effects.

As shown in FIG. 13, the LED-light base (13') has a female bulb socket (80) and added adaptor function provided by the adaptor receptacles (3000) (3000') (3100), which offer electricity to other electric appliances while the prong (3200) (3200') are connected to the wall outlet. At the same time, while prong (3200) (3200') connected with the wall outlet power source, the bulb socket (80) also will receive the wall outlet AC power source electric signal, which in the USA is around 110 Volt, 60 Hz, to turn on the said built-in or added-on LED bulb. On the other hand, specially designed LED bulb device (13) has a built-in circuit to change the wall outlet power source of 110V AC, 60 Hz to the working voltage and frequency of the LED(s) with desired control-kits such as a photo sensor, PIR sensor, manual switch, or other control means available in the marketplace to turn on LED(s) according to pre-determined functions, brightness, duration, and time.

The LED bulb (13) that fits into or built-into the bulb socket (80) has a base type (81) which may be but is not limited to a screw type base as shown in FIG. 13. The bulb base (81) has two electric terminals (83) and (82) to connect with electric signal electrodes (not shown) through an inner lamp holder (80) which connected with a prong (3200) (3200'). The AC electric signal from the two electric terminals (83) and (82) is supplied to the circuit board (81'), which changes the AC electric signal from home appliance electric current to LED working DC current and turns on the LED (85) for single color or multiple colors to provide a desired light performance. The LED (85) is located on the side of the circuit board (81') and connected with circuitry (81') and circuitry connect with the bulb base electric terminals (82) (83) by conventional conductive piece in circuit board (81'). The electric components (88) (85) may be installed on the circuit board (81') or connected by conductive piece (87) (84) away from the circuit board (81') because some components may be too big and unable to fit within the bulb base (81). The circuit board (81') is a narrow elongate board inserted into the bulb base (81), which is different with the prior art U.S. Pat. No. 6,227,679 (Zhang et al.) issued on May 8, 2001. The Zhang patent discloses a circuit board located on the top of the base, in a vertical relation to the circuit board and base. Also, in the arrangement of Zhang, the LEDs are not located on one side of the circuit board but rather are applied on the circuit board with a certain angle to the circuit board surface. This is because Zhang does not realize that the distance between the LED tip and the top cover is way too close and it is impossible to eliminate the spot-light problem of an LED light beam therefore cannot get a good light performance on the bulb surface. The current invention uses the invention described in one of the co-pending applications listed above, of an LED night light with more than one optics-lens, to make the spot-light beam into an area-light by first optics-lens. By adding a second optics-lens, the light beams brightness will be very close at every point on the desired area or surface.

As shown in FIG. 13, LED (85) on is situated on the edge of the circuit board (81') and positioned such that light beams from the LED are input to the first optics-lens (89) to cause the light beams to travel within the first optics-lens (89). The top may use a dome shape design or a "V" shape design to collect light beams that hit the top area of the first optics-lens. It will be appreciated that all equivalent treatments such as metallization of the top area or adding reflective arrangements within the first optics medium will be still fall within the scope of the invention. The LED device (13*b*) with screw type base can fit into a bulb night light's base socket (80) to replace the bulb and let the existing bulb night light become an LED night light without having to purchase a brand new unit to save money and change the big power consumption devices into a lower power consumption device in seconds.

This arrangement solves the problem with the arrangement disclosed in the Zhang patent cited above that there is not enough space in a night light having the most popular dimensions to achieve a good area lighting effect. The most popular night light length is around 88 mm+/−50 mm (with base). The lens height is around 60 mm+/−30 mm (without base). The distance from the wall outlet cover to the highest point of the night light edge is around 35 mm+/−15 mm (from outlet cover surface). If placed in the same location as the existing bulb night light, the distance from the bulb socket to the wall outlet surface will be less than 35 mm. This distance from the wall to outside of the lens will only be less than 35 mm+/−15 mm. It is too short to change the spot-light effect of the LEDs into a surface or area lighting effect. The solution, as disclosed in the co-pending U.S. application Ser. No. 11/806,284 filed on May 31, 2007 Publication data US 2008/030-4289, Now is U.S. Pat. No. 7,632,004 issued date Dec. 15, 2009. is to use two optics means to get a good surface or area lighted effect. This will be the best because LED night light power consumption falls within the 0.3 W+/−100% per LED range, whereas a bulb night light falls within a 4 Watt+/−50% per bulb range. As a result, the LED night light will have a big power saving and help reduce monthly electric bills for the consumer.

From above discussed and mentioned of preferred embodiments to show the scope of the current invention, it is appreciated that any alternative or equivalent functions of design still within the scope of the invention but not limited to all above discussion and mentioned details. The alternative or equivalent arrangement, process, installation or the like design, changes from the current invention still fall within the scope of the current invention.

I claim:

1. A LED night light including:

a first optical element and a second optical element; and at least one LED arranged to provide a uniform brightness over a light transmitting area of the second optical element which is separate from and assembled to a base of the LED night light, wherein the first optical element is configured to prevent people from touching electric parts, and wherein light beams exiting from the first optical element are emitted to at least one of an inner surface of the second optical element and an inner wall of the night light, and are reflected or refracted multiple times between at least two the first optical element, the second optical element, the inner wall of the night light, and a home wall to eliminate an LED spot-light effect and create the uniform brightness and a pre-determined illumination function; and wherein at least one electrical circuit that includes electric components is arranged to drive the at least one LED according to predetermined functions, timing, effects, and brightness.

2. The LED night light as claimed in claim 1, wherein the at least one LED includes one or more single color or at least one multiple color LED.

3. The LED night light as claimed in claim 1, wherein the night light has at least one of an AC-to-DC circuit, IC, switch, sensor, adaptor, outlet unit, or surge projection device.

4. The LED night light as claimed in claim 1, wherein the LED night light has an added function selected from the group consisting of:

(a) supplying power to other products through a female conductive receiving piece arranged to receive a male plug;

(b) a power fail, emergency light, or flashlight function in which a backup battery provides power to emit light beams from a location other than a front lens, (c) a surge protector;

(d) a multiple color effect function utilizing at least one second LED for emitting light through the front lens and a selection switch to select auto changing, color hold, motion, or dusk-to-dawn functions;

(e) a sleep or wakeup light timer function;

(f) a dimmer function for selecting a light brightness level.

5. A multiple function LED night light, comprising:

at least one LED arranged inside the LED night light to provide a uniform brightness over a light transmittable area of an outer front-lens or second optical element while light beams are emitted to a first optical element, wherein the first optical element is one of a tube, a cone, a ring, a multiple reflective or refractive surface piece with different diameters, and a cylinder shape having reflective and refractive optical properties; the first optical element being configured to change a narrow-emission-angle LED spotlight into wider-emission-angle light beam that spreads out from the first optical element, and wherein the wider-emission-angle light beam from the first optical element is emitted to at least one of an inner surface of the second optical element and an inner wall of the LED night light and refracted or reflected multiple times therebetween, or is reflected or refracted multiple times between or within at least two of the first optical element, the second optical element, the inner wall of the night light, and a home wall, to create the uniform brightness performance and pre-determined illumination function on one of the outer front-lens, the first optical element, or the second optical element;

wherein the LED night light further includes at least one electrical circuit to connect with prongs to deliver electricity from a home power source to the at least one LED and an added function device; and wherein the added-function device is selected from the group consisting of:

(a) a sensor device including at least one of a motion, photo, or radar sensor for turning the at least one LED on or off, (b) a surge, over-heat, over-charge, electric-shock, over-voltage, or over-current protector, (c) a camera and data storage device, (d) a power fail light or emergency light or flashlight device having a backup battery for power fail use and configured to emit a light beam from a location in the LED night light that is not the same as a location of the outer front-lens, (e) at least one second LED light source for a multiple color system which emits colored light for display on the outer front-lens by an IC and a select-switch to select, set, or adjust a color related function selected from at least one of color changing, color freezing, and brightness level in response to a motion-sensor and/or photo sensor, or a timer setting for a wakeup light or sleep light; and (f) at least one second LED light source for providing an indicator light function to show a charging status, power on/off, protection on/off, surge on/off, timer on/off, and/or power consumption status, and wherein the at least one electric circuit includes electric components selected from the group consisting of a resistor, capacitor, switch, sensor, diode, inductor, transformer, and integrated circuit, said components being arranged to drive the at least one LED and to drive the added-function device to provide predetermined functions.

6. The multiple function LED night light as claimed in claim 5, wherein the added-function device is at least one of an adaptor, receiving socket or port configured to receive another electrical device's male connector to provide power from the multiple function LED night light to the other electrical device.

7. The multiple function LED night light as claimed in claim 5, wherein the added-function device transmits electric signals having a predetermined frequency rating to transfer to other devices.

8. The multiple function LED night light as claimed in claim 5, wherein the added-function device is an electric power delivery or receiver device.

9. The multiple function LED night light as claimed in claim 5, wherein the added-function device is said surge protection device.

10. The multiple function LED night light as claimed in claim 5, wherein the added-function device is said emergency light, which during a power outage uses backup energy storage units to supply power to the multiple function LED night light and cause it to illuminate instantly during the power outage.

11. The multiple function LED night light as claimed in claim 5, further comprising an electric storage device is an SD card, micro SD card, or other memory device which stores electric signals.

12. The multiple function LED night light as claimed in claim 5, wherein the added-function device is at least one of a temperature measuring and time display device.

13. A multiple function LED night light including:

at least one LED arranged to serve as a light source for at least one of:

(1) an even brightness display on a light transmitting area of an outer front lens, even brightness resulting from multiple times reflection and refraction of light beams between at least two of:

(a) a first optical lens included in a (i) tube, or (ii) cone, or (iii) reflective or refractive surface piece, or (iv) ring with different diameters (b) the outer front lens or a second optical lens having reflective and refractive optic-properties, and (c) a light reflecting, non-transparent inner wall of a housing, or (2) a location or status indicator-light display directly behind one and only one of a front cover or lens; and at least one electric circuit to connect with at least one prong to deliver electricity from a home AC wall power source to the at least one LED and turn on the at least one LED for illumination according to predetermined functions, time, duration, color, and brightness, and also to deliver the electric power to at least one non-wireless additional function or device.

14. A multiple function LED night light as claimed in claim 13, wherein the additional function or device is a device that includes one of or combination of (1) an air-freshener, (2) a sound or audio device, (3) a bug repeller, (4) a time, date, weather with or without alarm device, (5) a timer to set sleep light or wakeup light with alarm setting device and (6) a base that can install an existing lamp base.

15. A multiple function LED night light as claimed in claim 13, wherein the additional function or device is a device that includes one of an electrically conductive receiving-end or adaptor or electrical power output or outlet device to supply power to another product.

16. A multiple function LED night light as claimed in claim 13, wherein, the additional function or device is a device that includes at least one second LED with an IC for multiple-color light display on the outer front lens or second optical element.

17. A multiple function LED night light as claimed in claim 13, wherein the additional function or device is a device that includes a second LED light device for a power fail light or emergency light or flashlight with a backup battery that emits light from a location different from the location of the outer front lens.

18. A multiple function LED night light as claimed in claim 13, wherein the additional function or device is a device that includes a second LED for a status indicator-light.

19. A multiple function LED night light as claimed in claim 13, wherein the additional function or device is a device that includes a plurality of LEDs with an IC for multiple color light functions including at least one of an auto changing light effect, color selection, and selectable motion or dust-to-dawn functions.

20. A multiple function LED night light as claimed in claim 13, wherein the additional function or device is a device that includes a plurality of LEDs to emit light to at least one or more than one front translucent, sand-blasted, or milky lens.

21. A multiple function LED night light as claimed in claim 13, wherein the additional function or device is a surge, short circuit, over charge, over heat, or other safety or protection device while has at least one AC outlet.

22. A multiple function LED night light as claimed in claim 13, wherein the additional function or device includes a selection switch having more than one position to set, select, or adjust at least one of colors, brightness, sound, time, auto changing color, freeze color, brightness, and power on and off.

23. A multiple function LED night light as claimed in claim 13, wherein the additional function or device is an AC outlet with female receiving-ends or ports.

24. A multiple function LED night light as claimed in claim 13, wherein the additional function or device is one of a sensor system including at least one of a motion sensor, photo sensor, and radar sensor.

* * * * *